United States Patent [19]

Bearden et al.

[11] 4,372,840

[45] Feb. 8, 1983

[54] PROCESS FOR REDUCING COKE FORMATION IN HEAVY FEED CATALYTIC CRACKING

[75] Inventors: Roby Bearden; Gordon F. Stuntz, both of Baton Rouge, La.

[73] Assignee: Exxon Research and Engineering Co., Florham Park, N.J.

[21] Appl. No.: 259,830

[22] Filed: May 4, 1981

Related U.S. Application Data

[63] Continuation-in-part of Ser. No. 108,396, Dec. 31, 1979, Pat. No. 4,280,896.

[51] Int. Cl.³ .................... C10G 9/16; C10G 11/18
[52] U.S. Cl. ............................ 208/113; 208/52 CT; 208/56; 208/120; 252/411 R; 252/415; 252/464
[58] Field of Search ............. 208/52 CT, 56, 89, 113, 208/120, 164

[56] References Cited

U.S. PATENT DOCUMENTS

| | | | |
|---|---|---|---|
| 2,575,258 | 11/1951 | Corneil et al. | 252/417 |
| 2,849,383 | 8/1958 | Hirschler et al. | 208/119 |
| 3,120,484 | 2/1964 | Mills et al. | 208/120 |
| 3,413,212 | 11/1968 | Weisz | 208/120 |
| 3,424,672 | 1/1969 | Mitchell | 208/164 |
| 3,479,279 | 10/1969 | Pohlenz | 208/56 |
| 3,533,936 | 10/1970 | Weisz | 208/56 |
| 3,711,422 | 1/1973 | Johnson et al. | 252/414 |
| 3,718,553 | 2/1973 | Stover | 208/120 |
| 4,025,545 | 5/1977 | Mendiratta et al. | |
| 4,031,002 | 6/1977 | McKay | 208/113 |
| 4,035,285 | 7/1977 | Owen et al. | 208/56 X |
| 4,111,845 | 10/1978 | McKay | 208/113 X |
| 4,141,858 | 2/1979 | McKay | 208/120 X |
| 4,148,712 | 4/1979 | Nichen et al. | 208/78 |
| 4,148,714 | 4/1979 | Nichen et al. | 208/114 |
| 4,162,213 | 7/1979 | Zrinscak, Sr. et al. | 208/89 |
| 4,166,806 | 9/1979 | McKay et al. | 208/114 X |
| 4,176,083 | 11/1979 | McGovern et al. | 208/164 X |
| 4,176,084 | 11/1979 | Luckenbach | 208/113 X |
| 4,200,520 | 4/1980 | Gladrow et al. | 208/120 |
| 4,206,038 | 6/1980 | Smith et al. | 208/113 |
| 4,268,416 | 5/1981 | Stine et al. | 252/416 |
| 4,280,896 | 7/1981 | Bearden et al. | 208/113 |
| 4,298,459 | 11/1981 | Tatterson et al. | 208/120 |

FOREIGN PATENT DOCUMENTS 729167  3/1966  Canada .

OTHER PUBLICATIONS

The Oil and Gas Journal, May 15, 1972, p. 112, R. N. Cimbalo, R. L. Foster & S. S. Wachtel, "Deposited Metal Poison FCC Catalyst".

Shankland & Schmitkons, "Determination of Activity and Selectivity of Cracking Catalyst", Proc. API 27 (III), 1947, pp. 57-77.

Primary Examiner—Delbert E. Gantz
Assistant Examiner—G. E. Schmitkons
Attorney, Agent, or Firm—Edward H. Mazer

[57] ABSTRACT

A method for decreasing the amount of coke produced during the cracking of hydrocarbon feedstock to lower molecular weight products in a reaction zone is disclosed, where the feedstock contains at least one metal contaminant selected from the class consisting of nickel, vanadium and iron and where the contaminant becomes deposited on the catalyst such that at least 50 wt. % of the total of the metal contaminants comprises only one of the metal contaminants. The method comprises adding a hydrogen donor material to the reaction zone, monitoring the composition of the metal contaminant on the catalyst, adding an effective passivating amount of at least one of the metal contaminants which is not the major contaminant on the catalyst and passing the catalyst from the reaction zone through a reduction zone maintained at an elevated temperature.

11 Claims, 1 Drawing Figure

PROCESS FOR REDUCING COKE FORMATION IN HEAVY FEED CATALYTIC CRACKING

CROSS-REFERENCE TO RELATED APPLICATIONS

This application is a continuation-in-part of U.S. patent application Ser. No. 108,396 filed Dec. 31, 1979, now U.S. Pat. No. 4,280,896.

BACKGROUND OF THE INVENTION

This invention relates to a method for decreasing the catalytic activity of metal contaminants on cracking catalysts and for decreasing the hydrogen and coke formation on cracking catalysts. More specifically, this invention is directed to a method for reducing the coke and hydrogen formation caused by metal contaminants, such as nickel, vanadium and/or iron, which have become deposited upon cracking catalysts from feedstock containing same.

In the catalystic cracking of hydrocarbon feedstocks, particularly heavy feedstocks, vanadium, nickel and/or iron present in the feedstock becomes deposited on the cracking catalyst promoting excessive hydrogen and coke makes. These metal contaminants are not removed during conventional catalyst regeneration operations during which coke deposits on the catalyst are converted to CO and $CO_2$. As used hereinafter the term "passivation" is defined as a method for decreasing the detrimental catalytic effects of metal contaminants such as nickel, vanadium and iron which become deposited on catalyst.

U.S. Pat. Nos. 3,711,422; 4,025,545; 4,031,002; 4,111,845; 4,141,858; 4,148,712; 4,148,714 and 4,166,806 all are directed to the contacting of the cracking catalyst with antimony compounds to passivate the catalytic activity of the iron, nickel and vanadium contaminants deposited on the catalyst. However, antimony compounds, alone, may not passivate the metal contaminants to sufficiently low levels particularly where the metal contaminant concentration on the catalyst is relatively high. U.S. Pat. No. 4,176,084 is directed to the passivation of metals contaminated catalyst in a regeneration zone operated for incomplete combustion of the coke to $CO_2$ by periodically increasing the oxygen concentration above that required for complete combustion of the coke and by maintaining the temperature above 1300° F. This patent does not disclose a method for passivating metals-contaminated catalyst in a system where the regeneration zone is routinely operated for complete combustion of the coke.

U.S. Pat. No. 4,162,213 is directed at decreasing the catalytic activity of metal contaminants present in cracking catalyst by regenerating the catalyst at temperatures of 1300°–1400° F. in such a manner as to leave less than 0.10 wt. % residual carbon on the catalyst.

Cimbalo, Foster and Wachtel in an article entitled "Deposited Metals Poison FCC Catalyst" published at pp 112–122 of the May 15, 1972 issue of *Oil and Gas Journal* disclose that the catalytic activity of metal contaminants decrease with repeated oxidation and reduction cycles.

U.S. Pat. No. 3,718,553 is directed at the use of a cracking catalyst impregnated with 100–1000 parts per million by weight (WPPM) of iron, nickel or vanadium or a combination of these metals to increase the octane number of the cracked hydrocarbon products. This reference does not recognize that use of certain of these metals may adversely affect the catalyst selectivity or activity.

U.S. Pat. Nos. 3,479,279 and 4,035,285 disclose hydrotreating of catalytic cracker product cuts and recirculating this product to the catalytic cracker. Related U.S. Pat. Nos. 3,413,212 and 3,533,936 disclose the use of hydrogen donor materials for decreasing the rate of coke formation on cracking catalyst. These patents each disclose in Table V that hydrotreating a fraction from a catalytic cracking zone and returning the hydrotreated material with the cat cracker feed decreases the coke make in the catalytic cracking zone. These patents also disclose that the hydrotreated material preferably is a hydrogen donor material which releases hydrogen to unsaturated olefinic hydrocarbons in a cracking zone without dehydrogenative action. Suitable materials disclosed are hydroaromatic, naphthene aromatic and naphthenic compounds. Preferred materials are compounds having at least one and preferably 2, 3 or 4 aromatic nuclei, partially hydrogenated and containing olefinic bonds. The hydrogen donor material was hydrogenated by contacting the donor material with hydrogen over a suitable hydrogenation catalyst at hydrogenation conditions.

The subject invention is directed at the addition of hydrogen donor material to a catalytic cracking zone in which the metals contaminated cracking catalyst has been passivated by passing the catalyst through a reduction zone maintained at an elevated temperature. The addition of hydrogen donor material and passivation of the cracking catalyst operate to decrease the coke makes on the cracking catalyst.

SUMMARY OF THE INVENTION

This invention is directed at a method for reducing the rate of coke production from a hydrocarbon feedstock cracked to lower molecular weight products in a reaction zone containing cracking catalyst of a catalytic cracking system comprising a reaction zone and a reduction zone where the feedstock contains at least one metal contaminant selected from the class consisting of nickel, vanadium, and iron, and where at least some of said metal comtaminant becomes deposited on the catalyst such that at least 50 wt. % of the total of said metal contaminants deposited on the catalyst comprises only one of said metal contaminants, and where said metal contaminant contributes to excessive hydrogen and coke production, the method comprising:

A. monitoring the composition of said metal contaminant deposited on the catalyst;

B. adding an effective passivating amount of at least one of said metal contaminants not present as the major contaminant on the catalyst;

C. passing the catalyst from the reaction zone through a reduction zone maintained at an elevated temperature for a time sufficient to at least partially passivate said metal contaminants on the catalyst; and, D. adding a hydrogen donor material into the reaction zone whereby at least a portion of the hydrogen donor material transfers hydrogen to the hydrocarbon feedstock and/or to the cracked lower molecular weight products to decrease the rate of coke formation on the cracking catalyst. The hydrogen donor material added to the reaction zone preferably has a boiling point between about 200° C. and about 500° C., more preferably between 200° C. and 325° C. In a preferred embodiment, the hydrogen donor material is obtained by fractionating the cracked molecular products from the reaction zone, passing the desired fraction through a hydrogenation zone and then recirculating the material to the reaction zone. The composition of the metal contaminant being deposited on the catalyst may be monitored by sampling either the feedstock or the catalyst. The catalyst may be still further passivated by the addition of known passivation agents to the system. In a preferred embodiment, the reduction zone is disposed between the regeneration zone and the reaction zone such that the catalyst circulated from the reaction zone through the regeneration zone passes through the reduction zone prior to re-entering the reaction zone.

BRIEF DESCRIPTION OF THE DRAWING

The FIGURE is a flow diagram of a fluidized catalytic cracking unit employing the subject invention.

DETAILED DESCRIPTION OF THE INVENTION

Figure 1:
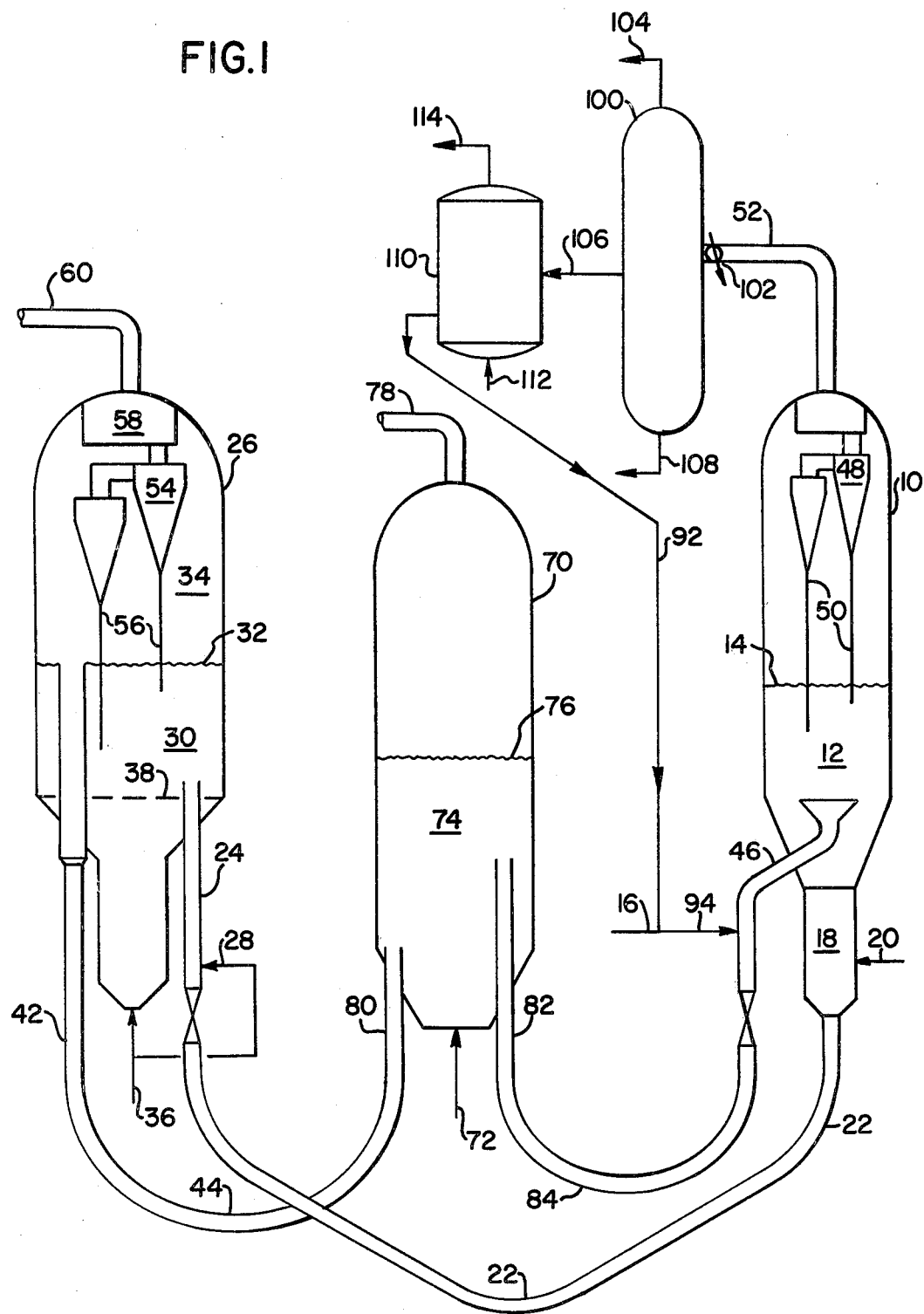

Referring to the FIGURE, the present invention is shown as applied to a typical fluid catalytic cracking process. Various items such as pumps, compressors, steam lines, instrumentation and other process equipment has been omitted to simplify the drawing. Reaction or cracking zone 10 is shown containing a fluidized catalyst bed 12 having a level at 14 in which a hydrocarbon feedstock is introduced into the fluidized bed through lines 16 and 94 for catalytic cracking. The hydrocarbon feedstock may comprise naphthas, light gas oils, heavy gas oils, residual fractions, reduced crude oils, cycle oils derived from any of these, as well as suitable fractions derived from shale oil kerogen, tar sands, bitumen processing, synthetic oils, coal hydrogenation, and the like. Such feedstocks may be employed singly, separately in parallel reaction zones, or in any desired combination. Typically, these feedstocks will contain metal contaminants such as nickel, vanadium and/or iron. Heavy feedstocks typically contain relatively high concentrations of vanadium and/or nickel as well as coke precursors, such as Conradson carbon materials. The determination of the amount of Conradson carbon material present may be determined by ASTM test D189-65, which is incorporated herein by reference. Hydrocarbon gas and vapors passing through fluidized bed 12 maintain the bed in a dense turbulent fluidized condition. Preferably hydrogen donor material passes through line 92 for preblending with cat cracker feedstock in line 16 prior to entering fluidized catalyst bed 12 through line 94. Alternatively the hydrogen donor material may be added directly to reaction zone 10 in close proximity to the point where the cat cracker feedstock enters reaction zone 10. Typically, the hydrogen donor material will comprise between about 5 and about 100 wt. % of the hydrocarbon feedstock to be cracked.

In reaction zone 10, the cracking catalyst becomes spent during contact with the hydrocarbon feedstock due to the deposition of coke thereon. Thus, the terms "spent" or "coke contaminated" catalyst as used herein generally refer to catalyst which has passed through a reaction zone and which contains a sufficient quantity of coke thereon to cause activity loss, thereby requiring regeneration. Generally, the coke content of spent catalyst can vary anywhere from about 0.5 to about 5 wt. % or more. Typically, spent catalyst coke contents vary from about 0.5 to about 1.5 wt. %.

Prior to actual regeneration, the spent catalyst is usually passed from reaction zone 10 into a stripping zone 18 and contacted therein with a stripping gas, which is introduced into the lower portion of zone 18 via line 20. The stripping gas, which is usually introduced at a pressure of from about 10 to about 50 psig, serves to remove most of the volatile hydrocarbons from the spent catalyst. A preferred stripping gas is steam, although nitrogen, other inert gases or flue gas may be employed. Normally, the stripping zone is maintained at essentially the same temperature as the reaction zone, i.e. from about 450° C. to about 600° C. Stripped spent catalyst from which most of the volatile hydrocarbons have been removed, is then passed from the bottom of stripping zone 18, through U-bend 22 and into a connecting vertical riser 24 which extends into the lower portion of regeneration zone 26. Air is added to riser 24 via line 28 in an amount sufficient to reduce the density of the catalyst flowing therein, thus causing the catalyst to flow upward into regeneration zone 26 by simple hydraulic balance.

In the particular configuration shown, the regeneration zone is a separate vessel (arranged at approximately the same level as reaction zone 10) containing a dense phase catalyst bed 30 having a level indicated at 32, which is undergoing regeneration to burn-off coke deposits formed in the reaction zone during the cracking reaction, above which is a dilute catalyst phase 34. An oxygen-containing regeneration gas enters the lower portion of regeneration zone 26 via line 36 and passes up through a grid 38 and the dense phase catalyst bed 30, maintaining said bed in a turbulent fluidized condition similar to that present in reaction zone 10. Oxygen-containing regeneration gases which may be employed in the process of the present invention are those gases which contain molecular oxygen in admixture with a substantial portion of an inert diluent gas. Air is a particularly suitable regeneration gas. An additional gas which may be employed is air enriched with oxygen. Additionally, if desired, steam may be added to the dense phase bed along with the regeneration gas or separately therefrom to provide additional inert diluents and/or fluidization gas. Typically, the specific vapor velocity of the regeneration gas will be in the range of from about 0.8 to about 6.0 feet/sec., preferably from about 1.5 to about 4 feet/sec.

Regenerated catalyst from the dense phase catalyst bed 30 in the regeneration zone 26 flows downward through standpipe 42 and passes through U-bend 44, and line 80 into reduction zone 70 maintained at a temperature above 500° C. preferably above about 600° C. having a reducing agent such as hydrogen or carbon monoxide, entering through line 72 to maintain a reducing environment in the reduction zone to passivate the contaminants as described in more detail hereinafter. The regenerated and passivated catalyst then passes from reduction zone 70 through line 82 and U-bend 84 into the reaction zone 10 by way of transfer line 46 which joins U-bend 84 near the level of the oil injection line 16 and hydrogen donor line 92.

By regenerated catalyst is meant catalyst leaving the regeneration zone which has contacted an oxygen-containing gas causing at least a portion, preferably a substantial portion, of the coke present on the catalyst to be removed. More specifically, the carbon content of the regenerated catalyst can vary anywhere from about 0.01 to about 0.2 wt. %, but preferably is from about 0.01 to about 0.1 wt. %. Predetermined quantities of selected metals or conventional passivation promoters may be added to the hydrocarbon feedstock through line 16 and/or 94, if desired, as described more fully hereinafter. The hydrocarbon feedstock for the cracking process, containing minor amounts of iron, nickel and/or vanadium contaminants is injected into line 46 through line 94 to form an oil and catalyst mixture which is passed into fluid bed 12 within reaction zone 10. The metal contaminants and the passivation promoter, if any, become deposited on the cracking catalyst. Product vapors containing entrained catalyst particles pass overhead from fluid bed 12 into a gas-solid separation means 48 wherein the entrained catalyst particles are separated therefrom and returned through diplegs 50 leading back into fluid bed 12. The product vapors are then conveyed through line 52 and condenser 102 into fractionation zone 100, wherein the product stream is separated into two or more fractions. Fractionation zone 100 may comprise any means for separating the product into fractions having different boiling ranges. Typically, zone 100 may comprise a plate or packed column of conventional design. In the embodiment shown the product is separated into an overhead stream exiting through line 104, comprising light boiling materials, i.e. compounds boiling below about 200° C., a middle cut boiling in the range of about 200° to 370° C. exiting through line 106 and a bottoms stream boiling above about 370° C. exiting through line 108. At least a fraction of the product in line 106, preferably a major fraction, passes into hydrogenation zone 110 maintained under hydrogenating conditions where the product contacts hydrogen entering zone 110 through line 112. A gaseous stream optionally may pass from zone 110 through line 114 for removal of any undesired by-products. Zone 110 typically will contain a conventional hydrogenating catalyst as, for example, a molybdenum salt such as molybdenum oxide or molybdenum sulfide, and a nickel or cobalt salt, such as nickel or cobalt oxides and/or sulfides. These salts typically are deposited on a support material such as alumina and/or silica stabilized alumina. Hydrogenation catalysts which are particularly suitable are described in U.S. Pat. No. 3,509,044, the disclosure of which is incorporated herein by reference. Zone 110 will be maintained at a temperature ranging between about 350° and 400° C. and a pressure ranging between about 600 and 3000 psi. A vapor stream exits zone 110 for recycling and a further processing (not shown). The at least partially hydrogenated stream exiting zone 110, also referred to as the hydrogen donor material, is recycled to the reaction zone through line 92.

In regeneration zone 26, flue gases formed during regeneration of the spent catalyst pass from the dense phase catalyst bed 30 into the dilute catalyst phase 34 along with entrained catalyst particles. The catalyst particles are separated from the flue gas by a suitable gas-solid separation means 54 and returned to the dense phase catalyst bed 30 via diplegs 56. The substantially catalyst-free flue gas then passes into a plenum chamber 58 prior to discharge from the regeneration zone 26 through line 60. Where the regeneration zone is operated for substantially complete combustion of the coke, the flue gas typically will contain less than about 0.2, preferably less than 0.1 and more preferably less than 0.05 volume % carbon monoxide. The oxygen content usually will vary from about 0.4 to about 7 vol. %, preferably from about 0.8 to about 5 vol. %, more preferably from about 1 to about 3 vol. %, most preferably from about 1.0 to about 2 vol. %.

Reduction zone 70 may be any vessel providing suitable contacting of the catalyst with a reducing environment at elevated temperatures. The shape of reduction zone 70 is not critical. In the embodiment shown, reduction zone 70 comprises a treater vessel having a shape generally similar to that of regeneration zone 26, with the reducing environment maintained, and catalyst fluidized by, reducing agent entering through line 72 and exiting through line 78. The volume of dense phase 74 having a level at 76 is dependent on the required residence time. The residence time of the catalyst in reduction zone 70 is not critical as long as it is sufficient to effect the passivation. The residence time will range from about 5 sec. to about 30 min., typically from about 2 to 5 minutes. The pressure in this zone is not critical and generally will be a function of the location of reduction zone 70 in the system and the pressure in the adjacent regeneration and reaction zones. In the embodiment shown, the pressure in zone 70 will be maintained in the range of about 5 to 50 psia, although the reduction zone preferably should be designed to withstand pressures of 100 psia. The temperature in reduction zone 70 should be above about 500° C. preferably above 600° C., but below the temperature at which the catalyst sinters or degrades. A preferred temperature range is about 600°–850° C., with the more preferred temperature range being 650°–750° C. The reduction zone 70 can be located either before or after regeneration zone 26, with the preferred location being after the regeneration zone, so that the heat imparted to the catalyst by the regeneration obviates or minimizes the need for additional catalyst heating. The reducing agent utilized in the reduction zone 70 is not critical, although hydrogen and carbon monoxide are the preferred reducing agents. Other reducing agents including light hydrocarbons, such as $C_3-$ hydrocarbons, may also be satisfactory.

Reduction zone 70 can be constructed of any chemically resistant material sufficiently able to withstand the relatively high temperatures involved and the high attrition conditions which are inherent in systems wherein fluidized catalyst is transported. Specifically, metals are contemplated which may or may not be lined. More specifically, ceramic liners are contemplated within any and all portions of the reduction zone together with alloy use and structural designs in order to withstand the maximum contemplated operating temperatures.

The reducing agent utilized in all but one of the following tests were high purity grade hydrogen, comprising 99.9% hydrogen. In the remaining test, shown in Table VIII a reducing agent comprising 99.3% CO was utilized. It is expected that commercial grade hydrogen, commercial grade CO, and process gas streams containing $H_2$ and/or CO can be utilized. Examples include cat cracker tail gas, catalytic reformer off-gas, spent hydrogen streams from catalytic hydroprocessing, synthesis gas, and flue gases. The rate of consumption of the reducing agent in reducing zone 70 will, of course, be dependent on the amount of reducible material entering the reducing zone. In a typical fluidized catalytic cracking unit it is anticipated that about 10 to 100 scf of hydrogen or about 10 to 100 scf of CO gas would be required for each ton of catalyst passed through reduction zone 70.

If the reducing agent entering through line 72 is circulated through reduction zone 70 and thence into other units, a gas-solids separation means may be required for use in connection with the reduction zone. If the reducing agent exiting from zone 70 is circulated back into the reduction zone, a gas-solids separation means may not be necessary. Preferred separation means for zones 10, 26 and 70 will be cyclone separators, multiclones or the like whose design and construction are well known in the art. In the case of cyclone separators, a single cyclone may be used, but preferably, more than one cyclone will be used in parallel or in series flow to effect the desired degree of separation.

The construction of regeneration zone 26 can be made with any material sufficiently able to withstand the relatively high temperatures involved when afterburning is encountered within the vessel and the high attrition conditions which are inherent in systems wherein fluidized catalyst is regenerated and transported. Specifically, metals are contemplated which may or may not be lined. More specifically, ceramic liners are contemplated within any and all portions of the regeneration zone together with alloy use and structural designs in order to withstand temperatures of about 760° C. and, for reasonably short periods of time, temperatures which may be as high as 1000° C.

The pressure in the regeneration zone is usually maintained in a range from about atmospheric to about 50 psig., preferably from about 10 to 50 psig. It is preferred, however, to design the regeneration zone to withstand pressures of up to about 100 psig. Operation of the regeneration zone at increased pressure has the effect of promoting the conversion of carbon monoxide to carbon dioxide and reducing the temperature level within the dense bed phase at which the substantially complete combustion of carbon monoxide can be accomplished. The higher pressure also lowers the equilibrium level of carbon on regenerated catalyst at a given regeneration temperature.

The residence time of the spent catalyst in the regeneration zone is not critical so long as the carbon on the catalyst is reduced to an acceptable level. In general, it can vary from about 1 to 30 minutes. The contact time or residence time of the flue gas in the dilute catalyst phase establishes the extent to which the combustion reaction can reach equilibrium. The residence time of the flue gas may vary from about 10 to about 60 seconds in the regeneration zone and from about 2 to about 30 seconds in the dense bed phase. Preferably, the residence time of the flue gas varies from about 15 to about 20 seconds in the dense bed.

The present invention may be applied beneficially to any type of fluid cat cracking unit without limitation as to the spatial arrangement of the reaction, stripping, and regeneration zones, with only the addition of reduction zone 70 and related elements. In general, any commercial catalytic cracking catalyst designed for high thermal stability could be suitably employed in the present invention. Such catalysts include those containing silica and/or alumina. Catalysts containing combustion promoters such as platinum can be used. Other refractory metal oxides such as magnesia or zirconia may be employed and are limited only by their ability to be effectively regenerated under the selected conditions. With particular regard to catalytic cracking, preferred catalysts include the combinations of silica and alumina, containing 10 to 50 wt. % alumina, and particularly their admixtures with molecular sieves or crystalline aluminosilicates. Suitable molecular sieves include both naturally occurring and synthetic aluminosilicate materials, such as faujasite, chabazite, X-type and Y-type aluminosilicate materials and ultra stable, large pore crystalline aluminosilicate materials. When admixed with, for example, silica-alumina to provide a petroleum cracking catalyst, the molecular sieve content of the fresh finished catalyst particles is suitably within the range from 5-35 wt. %, preferably 8-20 wt. %. An equilibrium molecular sieve cracking catalyst may contain as little as about 1 wt. % crystalline material. Admixtures of clay-extended aluminas may also be employed. Such catalysts may be prepared in any suitable method such as by impregnation, milling, co-gelling, and the like, subject only to the provision that the finished catalyst be in a physical form capable of fluidization. In the following tests a commercially available silica alumina zeolite catalyst sold under the tradename CBZ-1, manufactured by Davison Division, W. R. Grace & Company was used after steaming to simulate the approximate equilibrium activity of the catalyst.

Fractionation zone 100, of conventional design, typically is maintained at a top pressure ranging between about 10 and 20 psi and a bottoms temperature ranging up to about 400° C. The specific conditions will be a function of many variables including inlet product composition, inlet feed rates and desired compositions in the overhead, middle cut and bottoms. The middle cut fed to hydrogenation zone 110 preferably has a boiling range of about 200° to about 370° C. and is frequently referred to as a light cat cycle oil. The feed to the hydrogenation zone, preferably light cat cycle oil, should include compounds which will accept hydrogen in zone 110 and readily release the hydrogen in reaction zone 10 without dehydrogenative action. Preferred hydrogen donor compounds include two ring naphthenic compounds such as decahydronaphthalene (decalin) and two ring hydroaromatic compounds such as tetrahydronaphthalene (tetralin).

Hydrogenation zone 110 may be of conventional design. Typical hydrogenation catalysts include molybdenum salts and nickel and/or cobalt salts deposited on a support material. The residence time of the middle cut from zone 110 in the hydrogenation zone may range from about 10 to about 240 minutes, depending on the hydrogen donor, hydrogenation catalyst, operating conditions and the desired degree of hydrogenation.

As shown by the data in Tables I-IX the incorporation of a reduction zone 70 is not effective for passivating a metal contaminated catalyst unless a temperature in excess of about 500° C. is used.

The data in Table X shows that use of a hydrogen donor also decreases hydrogen and coke makes. When the use of a hydrogen donor is combined with the previously described passivation process, this results in still lower coke makes.

Unless otherwise noted the following test conditions were used. The CBZ-1 catalyst utilized was first steamed at 760° C. for 16 hours after which the catalyst was contaminated with the indicated metals by laboratory impregnation followed by calcining in air at about 540° C. for four hours. The catalyst was then subjected to the indicated number of redox cycles. Each cycle consisted of a five-minute residence in a hydrogen atmosphere, a five-minute nitrogen flush and then a five-minute residence in an air atmosphere at the indicated temperatures. Following the redox cycles the catalyst was utilized in a microcatalytic cracking (MCC) unit. The MCC unit comprises a captive fluidized bed of catalyst kept at a cracking zone temperature of 500° C.

Tests were run by passing a vacuum gas oil having a minimum boiling point of about 340° C. and a maximum boiling point of about 565° C. through the reactor for two minutes and analyzing for hydrogen and coke production. In Table I data is presented illustrating that the incorporation of a reduction step followed by an oxidation step (redox) significantly decreased the hydrogen and coke makes.

TABLE I

| Wt. % Metal on Catalyst | | | Treatment Prior to | Yields Wt. % on Feed | |
|---|---|---|---|---|---|
| Ni | V | Fe | Cracking | H₂ | Coke |
| 0.16 | 0.18 | | Calcined | 0.86 | 7.82 |
| 0.16 | 0.18 | | Redox 650° C. | 0.62 | 6.04 |
| 0.12 | 0.12 | | Calcined | 0.53 | 5.49 |
| 0.12 | 0.12 | | Redox 650° C. | 0.34 | 4.15 |
| 0.15 | 0.19 | 0.35 | Calcined | 1.16 | 10.61 |
| 0.15 | 0.19 | 0.35 | Redox 650° C. | 0.79 | 7.48 |

Table II illustrates that hydrogen and coke make reductions similar to that shown in Table I also were obtained on a metals contaminated catalyst wherein the metals had been deposited by the processing of heavy metal containing feeds rather than by laboratory impregnation.

TABLE II

| Wt. % Metal on Catalyst | | | Treatment | Yields Wt. % on Feed | |
|---|---|---|---|---|---|
| Ni | V | Fe | | H₂ | Coke |
| 0.28 | 0.31 | 0.57 | 510° C. Cracking 620° C. Regen. (Many cycles) | 1.13 | 9.11 |
| 0.28 | 0.31 | 0.57 | Redox 650° C. 4 cycles | 0.75 | 5.41 |
| 0.26 | 0.29 | 0.36 | 510° C. Cracking 707° C. Regen. (Many cycles) | 0.73 | 6.05 |
| 0.26 | 0.29 | 0.36 | Redox 650° C. 4 cycles | 0.53 | 3.94 |

Table III illustrates that the degree of passivation is a function of the reduction zone temperature. It can be seen that the adverse catalytic effects of the metal contaminants are only slightly reduced over that of untreated catalyst, where the temperature in reduction zone 70 is only 500° C. As the reduction zone temperature is increased, it can be seen that the degree of passivation increases.

TABLE III

| Wt. % Metal on Catalyst | Redox Treatment Temp. °C. | Yields Wt. % On Feed | |
|---|---|---|---|
| | | H₂ | Coke |
| 0.28Ni, 0.31V, 0.57Fe | No Redox Treatment | 1.13 | 9.11 |
| | 500 | 1.10 | 8.55 |
| | 600 | 0.99 | 7.94 |
| | 625 | 0.98 | 7.33 |
| | 650 | 0.75 | 5.41 |
| | 700 | 0.59 | 4.80 |
| | 750 | 0.50 | 4.11 |

Based on this data, it is believed that the reduction step decreases the hydrogen and coke makes and that the reduction must be performed at a temperature in excess of 500° C.

Table IV, illustrates that where only one of the metal contaminants is present, the redox step at 650° C. is not as effective in reducing the hydrogen and coke makes.

TABLE IV

| Wt. % Metal on Catalyst | Treatment Prior To Cracking | Yields, Wt. % on Feed | |
|---|---|---|---|
| | | H₂ | Coke |
| 0.21 Ni | Calcined | 0.80 | 8.10 |
| 0.21 Ni | Redox 650° C. 4 cycles | 0.72 | 7.96 |
| 0.29 V | Calcined | 0.38 | 3.88 |
| 0.29 V | Redox 650° C. 4 cycles | 0.36 | 4.20 |

Thus, to passivate the metal contaminants on a catalyst, where at least a major portion i.e., at least 50 wt. % of the total of the metal contaminants comprises nickel, vanadium or iron, it may be necessary to add predetermined quantities of either of the other two contaminants. Typically, crude oil will not contain relative high concentrations of iron. Vanadium and nickel, however, typically are found in many crudes, with the relative amounts varying with the type of crude. For example, certain Venezuelan crudes have relatively high vanadium and relatively low nickel concentrations, while the converse is true for certain domestic crudes. In addition, certain hydrotreated residual oils and hydrotreated gas oils may have relatively high nickel and relatively low vanadium concentrations, since hydrotreating removes vanadium more effectively than nickel. A catalyst could have substantial iron depositions where the iron oxide scale on process equipment upstream of the catalyst breaks off and is transported through the system by the feedstock. the relative catalytic activity of the individual metal contaminants nickel, vanadium and iron for the formation of hydrogen and coke are approximately 10:2.5:1. Based on this, iron preferably should be added to passivate catalyst contaminated only with nickel, or vanadium. Table V illustrates the passivation that is achieved by adding quantities of iron to catalyst comprising only vanadium or only nickel.

TABLE V

| Wt. % Metal on Catalyst | Treatment Prior to Cracking | Yield, Wt. % on Feed | |
|---|---|---|---|
| | | H₂ | Coke |
| 0.17 Ni | Calcined | 0.76 | 7.30 |
| 0.17 Ni, 0.23 Fe | Redox 650° C. 4 cycles | 0.51 | 5.27 |
| 0.29 V | Calcined | 0.38 | 3.88 |
| 0.29 V, 0.13 Fe | Redox 650° C. 4 cycles | 0.30 | 3.72 |

Table VI illustrates the passivation achieved by adding varying weights of vanadium to catalyst comprising only the nickel contaminant. Attention is directed to the fact that the addition of 0.02 wt. % vanadium followed by redox passivated the catalyst to a lower level than that achieved by redox alone. Combination of the nickel contaminated catalyst with 0.12 wt. % vanadium followed by redox further passivated the catalyst. However, combination of the nickel contaminated catalyst with 0.50 wt. % vanadium resulted in an increase in undesired catalytic activity over that of the catalyst containing only 0.12 wt. % nickel. Thus, there appears to be a level of addition of the second metal component, above which the effectiveness of the passivation decreases. The exact amount of nickel, vanadium or iron which should be added to a metal-contaminated catalyst has not been determined.

TABLE VI

| Wt. % Metal on Catalyst | | Treatment Prior To Cracking | Yields, Wt. % on Feed | |
|---|---|---|---|---|
| Ni | V | | $H_2$ | Coke |
| 0.12 | | Calcined | 0.60 | 5.65 |
| 0.12 | | Redox 650° C. 4 cycles | 0.44 | 4.78 |
| 0.12 | 0.02 | Redox 650° C. 4 cycles | 0.39 | 4.53 |
| 0.12 | 0.12 | Redox 650° C. 4 cycles | 0.34 | 4.15 |
| 0.12 | 0.50 | Calcined | 1.17 | 11.08 |
| 0.12 | 0.50 | Redox 650° C. 4 cycles | 0.72 | 6.86 |

Table VII illustrates passivation of a catalyst impregnated with equal weight percentages of nickel and vanadium. It should be noted that the redox at 650° C. resulted in a significant decrease in hydrogen and coke makes, but that, here also, the further addition of passivating metal in the form of iron actually increased the undesired catalytic activity of the metal contaminants slightly.

TABLE VII

| Wt. % Metal on Catalyst | | | Treatment Prior To Cracking | Yields, Wt. % on Feed | |
|---|---|---|---|---|---|
| Ni | V | Fe | | $H_2$ | Coke |
| 0.12 | 0.12 | | Calcined | 0.53 | 5.49 |
| 0.12 | 0.12 | | Redox 650° C. 4 cycles | 0.34 | 4.15 |
| 0.12 | 0.12 | 0.26 | Redox 650° C. 4 cycles | 0.37 | 4.50 |

Table VIII illustrates that metals-contaminated catalyst also can be passivated by the use of carbon monoxide rather than hydrogen as the reducing agent. In one run CP grade CO containing 99.3% CO by volume was utilized in the previously described passivation process while reagent grade hydrogen was used in the comparative run. It can be seen that both reducing agents passivated the catalyst to about the same extent.

TABLE VIII

| Wt. % Metal on Catalyst | | | Treatment Prior To Cracking | Yields, Wt. % on Feed | |
|---|---|---|---|---|---|
| Ni | V | Fe | | $H_2$ | Coke |
| 0.28 | 0.31 | 0.57 | Calcined | 0.13 | 9.11 |
| | | | Redox 650° C. 4 Cycles, $H_2$ | 0.75 | 5.41 |
| | | | Redox 650° C. 4 Cycles, CO | 0.73 | 5.83 |

As shown by the data of Table IX, the addition of iron or antimony followed by high temperature redox, reduced the rate of hydrogen and coke formation. The addition of both iron and antimony followed by high temperature redox leads to a still further decrease in hydrogen and coke makes.

TABLE IX

| Wt. % Metal on Catalyst | Treatment Prior To Cracking | Yields, Wt. % on Feed | |
|---|---|---|---|
| | | $H_2$ | Coke |
| 0.17 Ni | Calcined | 0.76 | 7.30 |
| 0.17 Ni, 0.23 Fe | Redox 650° C. 4 cycles | 0.51 | 5.27 |
| 0.27 Ni | Calcined | 0.83 | 8.40 |
| 0.27 Ni, 0.52 Sb | Redox 650° C. 4 cycles | 0.59 | 6.03 |
| 0.27 Ni, 0.52 Sb, 0.34 Fe | Redox 650° C. | 0.54 | 5.31 |

TABLE IX-continued

| Wt. % Metal on Catalyst | Treatment Prior To Cracking | Yields, Wt. % on Feed | |
|---|---|---|---|
| | | $H_2$ | Coke |
| | 4 cycles | | |

In addition to antimony, it is believed that other known passivation agents such as tin, bismuth and manganese in place of the antimony also would decrease the hydrogen and coke makes.

It has been found that one passage through the reaction and regeneration zones reduces the effectiveness of the reduction zone passivation. Thus, at least a portion of the catalyst preferably is passed through reduction zone 70 on every catalyst regeneration cycle.

The quantity of metal contaminant, or passivation promoter, if any, that should be added to the system may be determined preferably by monitoring the hydrogen and coke makes in the reaction zone or by analyzing the metal contaminant concentration either in the hydrocarbon feed or on the catalyst. Where additional iron, vanadium or nickel is to be added to the system to reduce the hydrogen and coke makes, it is believed that the additional quantities of these metals should be added to the feed, rather than impregnated onto the catalyst prior to use. Impregnation of an excess of these metals onto the catalyst prior to use in the cracking operation may lead to higher initial hydrogen and coke makes. Moreover, where passivation promoters having relatively high vapor pressures, such as antimony, are used, some of the passivation promotor may be lost to the atmosphere if it is impregnated onto the catalyst. It has been found that the passivation efficiency of antimony is higher when the antimony is incorporated into the hydrocarbon feedstock than when it is impregnated onto the catalyst.

Table X shows that the addition of a hydrogen donor to the reaction zone reduces the hydrogen and coke makes. When this is combined with the previously described passivation process, still lower coke makes result. In Table X the feed for all tests was 60% vacuum gas oil (VGO), and 40% light cat cycle oil (LCCO). The vacuum gas oil had a minimum boiling point of about 340° C. and a maximum boiling point of about 565° C. as in the previous tests. The light cat cycle oil had a minimum boiling point of about 200° C. and a maximum boiling point of about 325° C. In the first test shown in Table X the LCCO was not hydrogenated and the metals contaminated catalyst was not passivated. In the second test the LCCO fraction of the feed was hydrogenated by passing the LCCO through a hydrogenation zone maintained at a temperature of about 371° C. and 2000 psig, comprising a nickel-molybdenum sulfided catalyst in a carbonaceous matrix to increase the hydrogen content of the LCCO fraction from 10.51 wt. % hydrogen to 12.10 wt. % hydrogen. The average residence time of the LCCO in the hydrogenation zone was about 180 minutes. In the third test, the LCCO fraction of the feed was not hydrogenated, but the catalyst was passivated by subjecting the catalyst to 4 redox cycles in a hydrogen atmosphere as previously described. In the fourth test the LCCO fraction of the feed was hydrogenated as in test 2, and the catalyst was passivated as in test 3. It may be seen that the coke make in test 4 was substantially lower than that in tests 1, 2 or 3, thus demonstrating that use of a hydrogen donor material in the feed combined with catalyst passivation decreases the coke make more than either process alone.

TABLE X

| Wt. % Metal on Catalyst | | | Test No. | Treatment Prior To Cracking | Yields, Wt. % on Feed | |
|---|---|---|---|---|---|---|
| Ni | V | Fe | | | $H_2$ | Coke |
| 0.48 | 0.61 | 0.61 | 1 | No LCCO hydrogenation. No catalyst passivation | 1.10 | 10.10 |
| | | | 2 | LCCO hydrogenated. No catalyst passivation | 1.02 | 8.16 |
| | | | 3 | No LCCO hydrogenation. Catalyst passivated. Redox 750° C. 4 cycles, $H_2$ | 0.76 | 6.67 |
| | | | 4 | LCCO hydrogenated. Catalyst passivated. Redox 750° C. 4 Cycles, $H_2$ | 0.75 | 4.60 |

Although the subject process has been described with reference to a specific embodiment, it will be understood that it is capable of further modification. Any variations, uses or adaptations of the invention following, in general, the principles of the invention are intended to be covered, including such departures from the present disclosure as come within known or customary practice in the art to which the invention pertains and as may be applied to the essential features hereinbefore set forth, and as fall within the scope of the invention.

What is claimed is:

1. A method for reducing the rate of coke and hydrogen production from a hydrocarbon feedstock cracked to lower molecular weight products in a reaction zone containing cracking catalyst of a catalytic cracking system comprising a reaction zone and a reduction zone where the feedstock contains at least one metal contaminant selected from the class consisting of nickel, vanadium, and iron, and where at least some of said metal contaminant becomes deposited on the catalyst such that at least 50 wt. % of the total of said metal contaminant deposited on the catalyst comprises only one of said metal contaminants, and where said metal contaminant contributes to excessive hydrogen and coke production, said method comprising:
   A. monitoring the composition of said metal contaminant deposited on the catalyst;
   B. adding an effective passivating amount of at least one of said metal contaminants not present as the major contaminant on the catalyst;
   C. passing the coke and metal contaminated catalyst from the reaction zone to a regeneration zone maintained at regeneration conditions having a regeneration gas passing therethrough whereby at least a portion of the coke is removed from the catalyst and thereafter the catalyst is passed through a reduction zone maintained at an elevated temperature for a time sufficient to at least partially passivate said metal contaminants on the catalyst while a reducing environment is maintained in said reduction zone by the addition to the reduction zone of material selected from the class consisting of hydrogen, carbon monoxide and mixtures thereof; and,
   D. adding a hydrogen donor material into the reaction zone whereby at least a portion of the hydrogen donor material transfers hydrogen to the hydrocarbon feedstock and/or to the cracked lower molecular weight products to decrease the rate of coke formation on the cracking catalyst.

2. The method of claim 1 wherein the hydrogen donor material added to the reaction zone has a boiling point ranging between about 200° C. and about 500° C.

3. The method of claim 2 wherein the hydrogen donor material added to the reaction zone has a boiling point ranging between about 200° C. and about 325° C.

4. In a hydrocarbon cracking process of the type wherein:
   A. hydrocarbon feedstock containing a metal contaminant selected from the class consisting of nickel, vanadium, and iron is passed into a reaction zone having a cracking catalyst therein at cracking conditions to form cracked hydrocarbon products and wherein coke and at least some of the metal contaminant becomes deposited on the catalyst such that at least 50 wt. % of the total of said metal contaminant deposited on the catalyst comprises only one of said metal contaminants; and
   B. the coke and metal contaminated catalyst is passed to a regeneration zone maintained at regeneration conditions having a regeneration gas passing therethrough whereby at least a portion of the coke is removed from the catalyst, the improvement which comprises:
      aa. monitoring the composition of said metal contaminant being deposited on the catalyst;
      bb. adding an effective passivating amount of at least one of said metal contaminants not present as the major contaminant on the catalyst;
      cc. passing the catalyst through a reduction zone maintained at an elevated temperature while a reducing environment is maintained in said reduction zone by the addition to the reduction zone of a material selected from the class consisting of hydrogen, carbon monoxide and mixtures thereof prior to the catalyst being returned to the reaction zone whereby said metal contaminants are at least partially passivated; and
      dd. adding a hydrogen donor material into the reaction zone whereby at least a portion of the hydrogen donor material transfers hydrogen to the hydrocarbon feedstock and/or to the cracked lower molecular weight products to decrease the rate of coke formation on the cracking catalyst.

5. The process of claim 4 wherein the hydrogen donor material is obtained by:
   A. fractionating the cracked lower molecular weight products from the reaction zone;
   B. passing a portion of the fractionated product through a hydrogenation zone to at least partially hydrogenate the fractionated product; and
   C. passing the fractionated product from the hydrogenation zone into the reaction zone.

6. The method of claim 5 wherein the hydrogenation zone is maintained at a pressure ranging between about 600 and 3000 psig.

7. The method of claim 5 wherein the hydrogenation zone is maintained at a temperature ranging between about 350 and about 400° C.

8. The method of claim 7 wherein the hydrogenation zone contains a hydrogenation catalyst selected from the class consisting of: molybdenum oxide, molybdenum sulfide, nickel oxide, nickel sulfide, cobalt oxide, cobalt sulfide and wherein the residence time of the hydrogen donor material in the hydrogenation zone ranges between about 10 and about 240 minutes.

9. The method of claim 8 wherein the hydrogen donor material added to the reaction zone ranges between about 5 and about 100 wt. % of the hydrocarbon feedstock to be cracked.

10. The process of claim 9 wherein at least 50 wt. % of the metal contaminant comprises nickel and wherein the effective passivating amount of metal contaminant added is selected from the class consisting of iron, vanadium and mixtures thereof.

11. The process of claim 10 further comprising the addition of a passivation agent selected from the class consisting of antimony, tin, bismuth, and manganese to further passivate the catalyst.

* * * * *